United States Patent
Wobben

(10) Patent No.: US 6,806,586 B2
(45) Date of Patent: Oct. 19, 2004

(54) APPARATUS AND METHOD TO CONVERT MARINE CURRENT INTO ELECTRICAL POWER

(76) Inventor: Aloys Wobben, Argerstrasse 19, D-26607 Aurich (DE)

( * ) Notice: Subject to any disclaimer, the term of this patent is extended or adjusted under 35 U.S.C. 154(b) by 0 days.

(21) Appl. No.: 10/120,932

(22) Filed: Apr. 10, 2002

(65) Prior Publication Data

US 2003/0193198 A1 Oct. 16, 2003

Related U.S. Application Data

(63) Continuation-in-part of application No. 10/118,663, filed on Apr. 8, 2002, now abandoned, which is a continuation-in-part of application No. 10/110,009, filed as application No. PCT/EP00/07665 on Aug. 8, 2000, now abandoned.

(30) Foreign Application Priority Data

Oct. 6, 1999 (DE) ......................................... 199 48 198

(51) Int. Cl.[7] ............................................... F03B 13/00
(52) U.S. Cl. .............................. 290/54; 290/53; 416/84
(58) Field of Search ........................ 290/54, 43; 416/84

(56) References Cited

U.S. PATENT DOCUMENTS

| 328,447 | A | * | 10/1885 | Brady | 290/43 |
|---|---|---|---|---|---|
| 3,209,156 | A | * | 9/1965 | Struble, Jr. | 290/54 |
| 3,980,894 | A | * | 9/1976 | Vary et al. | 290/54 |
| 4,045,148 | A | * | 8/1977 | Morin | 416/84 |
| 4,078,388 | A | | 3/1978 | Atencio | 61/19 |
| 4,205,943 | A | * | 6/1980 | Vauthier | 416/86 |
| 4,274,009 | A | * | 6/1981 | Parker, Sr. | 290/43 |
| 4,306,157 | A | * | 12/1981 | Wracsaricht | 290/54 |
| 4,367,413 | A | * | 1/1983 | Nair | 290/52 |
| 4,383,182 | A | * | 5/1983 | Bowley | 290/43 |
| 4,524,285 | A | * | 6/1985 | Rauch | 290/43 |
| 4,720,640 | A | | 1/1988 | Anderson et al. | 290/43 |
| 4,816,697 | A | * | 3/1989 | Nalbandyan et al. | 290/54 |
| 4,868,408 | A | * | 9/1989 | Hesh | 290/52 |
| 5,281,856 | A | | 1/1994 | Kenderi | 290/54 |

FOREIGN PATENT DOCUMENTS

| DE | 43 22 980 C2 | 10/1994 |
|---|---|---|
| DE | 197 48 635 A1 | 5/1999 |
| EP | 0 002 995 A1 | 7/1979 |
| FR | 2 378 957 | 8/1978 |
| FR | 2 548 737 | 1/1985 |

OTHER PUBLICATIONS

Venezia, W. et al., "Turbine Under Gulf Stream: Potential Energy Source," *Sea Technology*, 36(9): Sep. 10–14 1995.
Charlier, R.H. et al., "Ocean Energies—Environmental, Economic and Technological Aspects of Alternative Power Sources," *Elsevier Ocenography Series*, pp. 69–76, 1993, ISBN: 0 444 88248 0.
Lissaman, P., "The Criolis Program," *Oceanus: International Perspectives on our Ocean Environment*, 22(4):23–28, Jan. 1980.

* cited by examiner

Primary Examiner—Joseph Waks
(74) Attorney, Agent, or Firm—Seed IP Law Group PLLC

(57) ABSTRACT

A marine current power installation that takes energy from marine currents. The marine current power installation takes kinetic energy of flow from the marine current and converts the kinetic energy into electrical energy. The marine current water power installation is used below the water level, for example, more than 50 m below the water level. The power installation can make a relatively large amount of power available even when the flow speed of the marine current is relatively low, for example, in the region of 1.5 m/sec or less. The water power installation has a water wheel or a rotor (turbine or propeller) which is of a diameter of, for example, 10 m or more, preferably between 30 m and 120 m.

13 Claims, 5 Drawing Sheets

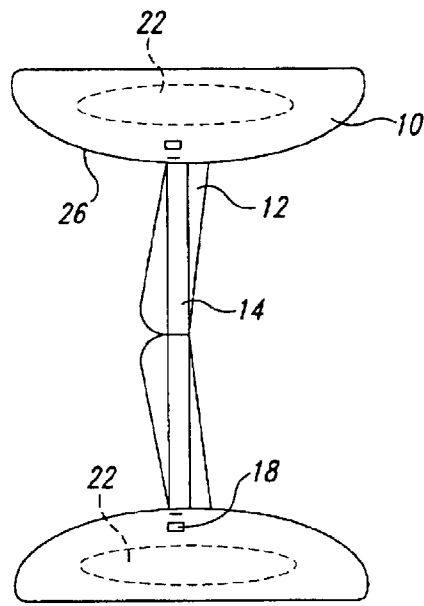
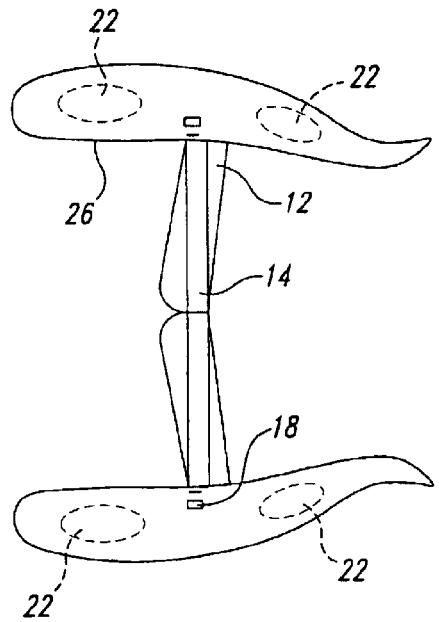
Fig. 3  Fig. 4
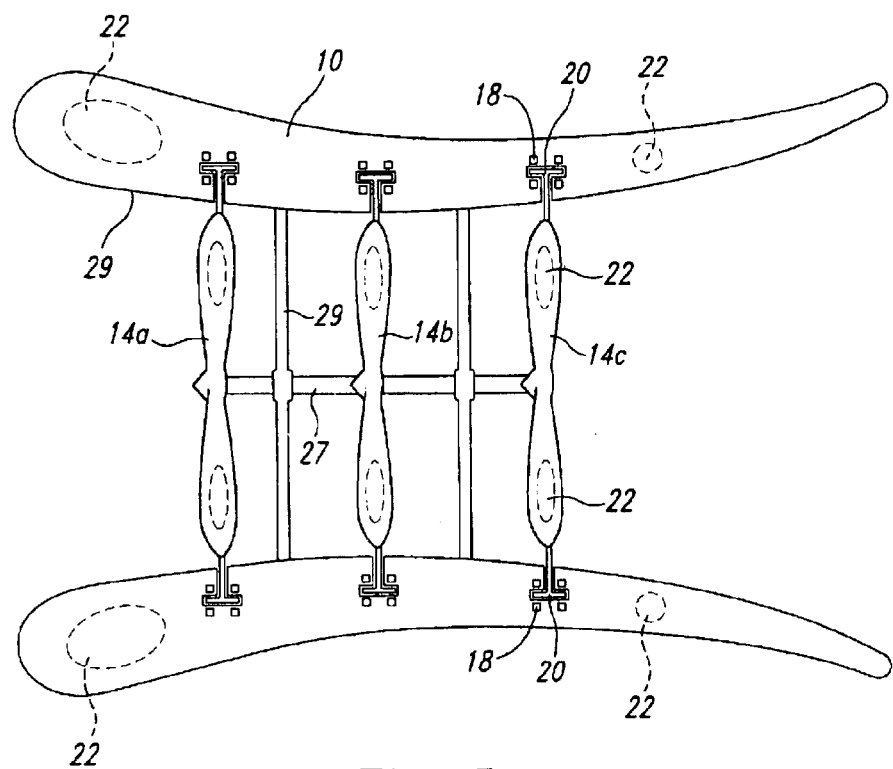
Fig. 5

APPARATUS AND METHOD TO CONVERT MARINE CURRENT INTO ELECTRICAL POWER

CROSS-REFERENCE TO RELATED APPLICATION

This application is a continuation-in-part of U.S. patent application Ser. No. 10/118,663, filed Apr. 8, 2002 now abandoned, which is a continuation-in-part of U.S. patent application Ser. No. 10/110,009, filed Apr. 5, 2002 now abandoned which is a 371 of PCT/EP00/07665 filed Aug. 8, 2000, which applications are incorporated herein by reference in their entirety.

FIELD OF THE INVENTION

The invention relates to a marine current power installation. In particular, the invention involves not just a tidal power installation which makes use of the energy of tidal ebb and flow, but a power installation which takes energy from marine currents which constantly occur over all oceans.

BACKGROUND OF THE INVENTION

Marine currents are usually large-area stationary current systems, the production of which can be decisively attributed to the thrust force of the wind at the surface of the sea (drift current), internal pressure forces (gradient current) and the rotation of the Earth (Coriolis force) and the topography of the ocean bottom and the coasts. The most important marine currents may be mentioned made by way of example, including the North and South Equatorial Currents, the Kuroshio, the East Australian Current, the Gulf Stream, the Brazil Current, the Agulhas Current, the North Pacific Current, the North Atlantic Current, the West Wind Drift, the Californian Current, the Humboldt Current, the Canary Current, the Benguela Current, the Western Australian Current, Equatorial Countercurrents, the Alaska Current, the Norwegian Current, the West Spitsbergen Current, the East Greenland Current, the Labrador Current, the Irminger Current, the Oyashio and the Falklands current. Besides the known surface currents in the oceans there are pronouncedly in the Atlantic and Pacific Oceans the Equatorial Sub-currents (up to 2.5 m/sec flow speed) which at a depth of around 100 m (or deeper) flow eastwards directly onto the Equator under the westwardly directed South Equatorial Current.

BRIEF SUMMARY OF THE INVENTION

The invention provides a marine current power installation which takes kinetic energy of flow from the marine current and converts the taken energy into electrical energy. In those cases in which the marine current water power installation according to the invention is used below the water level, for example more than 50 m below the water level, it can make a relatively large amount of power available even when the flow speed of the marine current is relatively low, for example in the region of 1.5 m/sec or less. That is achieved in that the water power installation has a water wheel or a rotor (turbine or propeller) which is of a large diameter, of for example 10 m or more, preferably between 30 m and 120 m in diameter.

DETAILED DESCRIPTION OF THE SEVERAL VIEWS OF THE DRAWINGS

FIG. 3 is a cross-sectional view of an alternative embodiment of the device of FIG. 1.

FIG. 4 is a cross-sectional view of a further alternative embodiment of the device of FIG. 1.

FIG. 5 is a further alternative embodiment of a cross-sectional view of the device of FIG. 1.

DETAILED DESCRIPTION OF THE INVENTION

Figure 1:
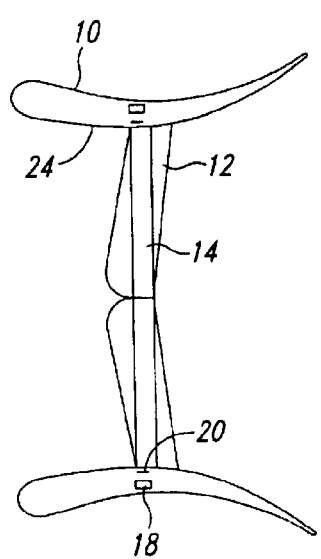
FIG. 1 shows a cross-sectional view of a marine current power generation structure.

FIG. 1 shows by way of example a view in cross-section of a marine current water power installation according to the invention. This power installation has an annular housing 10 which has a very high level of strength. The annular housing is also in the form of a concentrator (duct casing) so that the flow speed of the water passing into the ring is increased. Provided in the central region of the housing is a water wheel or propeller 14 which is driven by the flow speed of the water. It rotates and in so doing at the same time drives a generator rotor 20 of a generator. In this embodiment, the generator is not coupled with a shaft to the turbine but the pole wheel of the generator rotor 20 is fixed externally to the water wheel. Accordingly, the water wheel or the rotor 20 of the power installation carries the generator rotor 20 at its tip which is surrounded by a generator stator in the housing of the water power installation. The forces acting on the water wheel are carried by main bearings which rest on a support spider which passes through the housing ring.

Figure 2A:
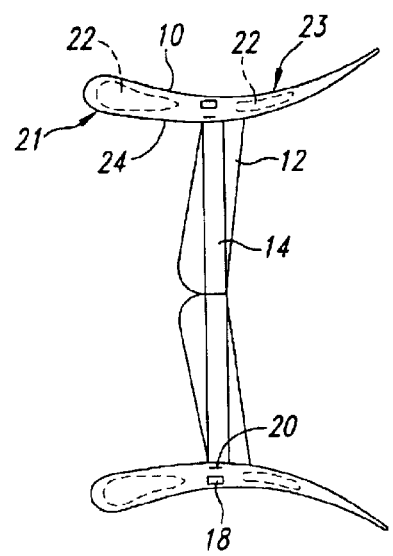
FIG. 2A is a cross-sectional view of the marine current power generation structure according to the present invention having chambers therein.

As shown in FIG. 2A, preferably the rotor 20 or the water wheel and/or the housing of the water power installation has chambers 22, which may also be called cavities 22, which can be flooded so that a condition of equilibrium of the water power installation in relation to the water occurs. That ensures that the bearing arrangement of the water power installation only has to still carry the thrust of the flowing water.

As shown in FIG. 2A, the cavities 22 can be filled with air when transporting the water power installation to the position of installation. A ship can thus easily transport the water power installation in a floating condition to the position of installation. As soon as the water power installation has reached its intended position of installation the cavities 22, according to the desired depth and design for that location, are filled to a selected level with water, preferably sea water, so that the water power installation can slowly sink to the desired depth, whether to the partially submerged, fully submerged, or to selected depth or completely to the bottom. If conversion of the water power installation or repair should be necessary, the water can be removed out of the cavities 22 and it will easily float again.

It is possible for the water power installation to be both directly anchored to the bed and/or to be fixed at a certain spacing from the ocean floor by suitable cables or chains which are arrested on the ocean floor, or other structures.

The energy which is produced by the generator is carried away by means of cables and fed directly into the energy network. It is also possible for the energy produced by the marine current water power installation to be used to supply power to sea water desalination plants.

Even if marine currents involve relatively low flow speeds, the following numerical example can make it clear that very large amounts of electrical energy (and a corresponding power of more than 500 KW) can be produced, depending on how high the respective marine current speed is and how large the diameter of the water wheel of the power installation is.

Thus, it is for example possible to already produce a power output of 500 KW with a marine current speed of 1.5 m/sec and a water wheel diameter of 25 m. If the diameter of the water wheel is increased to 80 m a power output of 5 MW is possible. With a water wheel diameter of 36 m a power output of 1 MW is still possible.

If the marine current speed rises then the amount of electric power rises with the third power in relation thereto.

The particular advantage of the marine current power installation according to the invention is that it can be used where in practice the power installation itself does not adversely affect the environment. At the same time the marine current power installation can make available an energy source which is almost inexhaustible and the behavior of which is very accurately predictable. In spite of the size of the marine current water power installation, by virtue of flooding of the cavities 22 or by virtue of expelling the water from the cavities 22, the power installation can be very accurately positioned in the marine currents where it does not have any adverse influence on shipping because it is below the usual draughts of sea-going vessels.

It should be noted that the marine current power installation according to the invention can also be employed to make use of ebb and flow currents which regularly occur with a tide. For that purpose it is desirable for the rotor 20 blades to be so designed that they can convert flows from both sides (rotation in two different directions) or can preferably turn with a change in the flow direction.

Figure 2B:
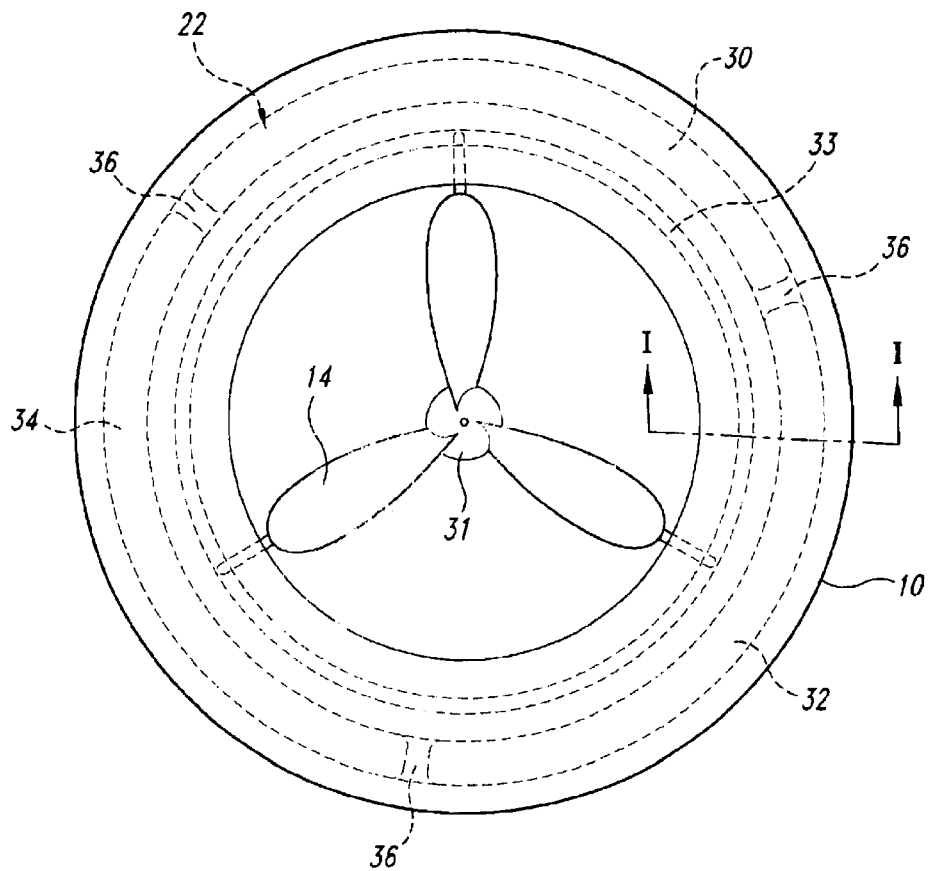
FIG. 2B is a front view of the device of FIG. 1B.

FIG. 2B is a front view of the device of FIG. 1. As can be seen, the chamber 22 is positioned in the annular housing 10. In one embodiment, the chamber 22 is divided into separate chambers 30, 32, and 34. A ceiling member 36 is positioned between the separate chambers so that each chamber may be individually evacuated with water, or filled with water. By having the chambers isolated from each other, the device has an extra safety built in so that in the event one of the chambers leaks, the other chambers will be sufficient to stabilize the device and also to raise it to the surface. Having separate chambers 22 provides additional, distinct advantages in addition to safety in the event one of them leaks. The position, shape and number of the chambers is selected to provide a desired buoyancy and orientation of the device through selected filling of the chambers in a desired location and with a desired amount of fluid. For example, as can be seen in FIG. 2A, the chambers 22 include a front chamber 21 and a rear chamber 23. If the front and rear chambers 21 and 23 are filled in an equal amount with water, they will provide a equal effect on the buoyancy and orientation of the housing 10. On the other hand, it is recognized that the housing 10 may be more heavily weighted in the front or in the back than in other portions. Accordingly, a larger chamber 21 can be provided in the front so that more buoyancy can be provided at the front to selectively fill the chamber separate from the back chamber 23 and ensure that the housing is kept in the correct orientation and stable in the water at all times. In some ocean environments, it may be desired to have the housing pointed downward, so that the current flows in the desired direction and orientation through the housing. In this instance, the front chamber 21 will be filled more with water and the back chamber 23 will be generally evacuated. To achieve other orientations, other selective filling of the chambers may be used.

As shown in FIG. 2B, by having the chambers 30, 32 and 34 spaced at different locations around the device it is possible to obtain a desired radial orientation in the water as well. For example, chamber 30 may be selectively evacuated while chambers 34 and 32 have more water placed therein. This will place chamber 30 at the top. Thereafter, even though the device may receive some turbulence, and from time to time may be slightly rotated since the chamber 30 is more buoyant, it will always rotate to the more stable position.

In the embodiment of FIGS. 1, 2A, and 2B, the bearings to support the propeller 14 are in the outer circumference 33 so that no central shaft for support is needed. Rather, the central hub 31 is used only to support the blades of the propeller 14.

FIG. 3 illustrates and alternative embodiment for the interior surface 26 of the housing. In FIG. 2A, the interior surface 24 of the housing is selected to provide a desired concentrator of the flow so as to increase the speed as it approaches the propeller 14. The outer shape of the housing 10 is also provided to permit smooth, laminar flow of the water passing through or around the housing 10. The embodiment of FIG. 3 has an inner surface 26 which provides a different shape for the water impacting the propeller 14. The cavities 22 in the housing 10 can be appropriately shaped and positioned as desired for the particular shape 26.

FIG. 4 illustrates yet another alternative embodiment for the surface 26 over which the water passes prior to imparting power to the propeller 14.

FIG. 5 illustrates an enlarged multi-propeller water-power installation. In this embodiment, more than one propeller 14 is present within the housing 10. Each of the propellers 14 is coupled to a common shaft so as to provide an assist in the rotation to each other. Further, each of the propellers 14 have associated therewith an individual rotor 20 and a stator 18 from which power is provided. The common shaft 27 as between the propellers 14 may have different gearings therein so as to obtain a different amount of power from each of the propellers. For example, the first propeller 14a may have a different gearing system and therefore perform a different work function than the second propeller 14b. The middle propeller 14b, being at the most narrow part of the housing, will see a larger current flow and therefore may be able to extract more power which is produced at its respective stator 18. The final blade 14c may be in the form of a finishing blade having a shape to extract some final amount of power from the water flow. It thus, may have a very light work function and be geared to spin very easily. Thus, the final propeller 14c will be able to extract some power from the flow of water which could not be extracted by the first two propellers. A central spider 29 is positioned to support the shaft 27 which runs through the center of the respective propellers 14a, 14b, and 14c. The shape of the interior surface 29 of the housing 10 is selected based on the desired force to be imparted to each of the propellers 14a, 14b, and 14c. In addition, FIG. 5 illustrates the embodiment in which chambers 22 are formed within the blades themselves, providing additional buoyancy to the device. The chambers 22 may be selectively formed in different locations within the blades so as to provide even distribution and buoyancy, as explained in more detail later herein.

Figure 6:
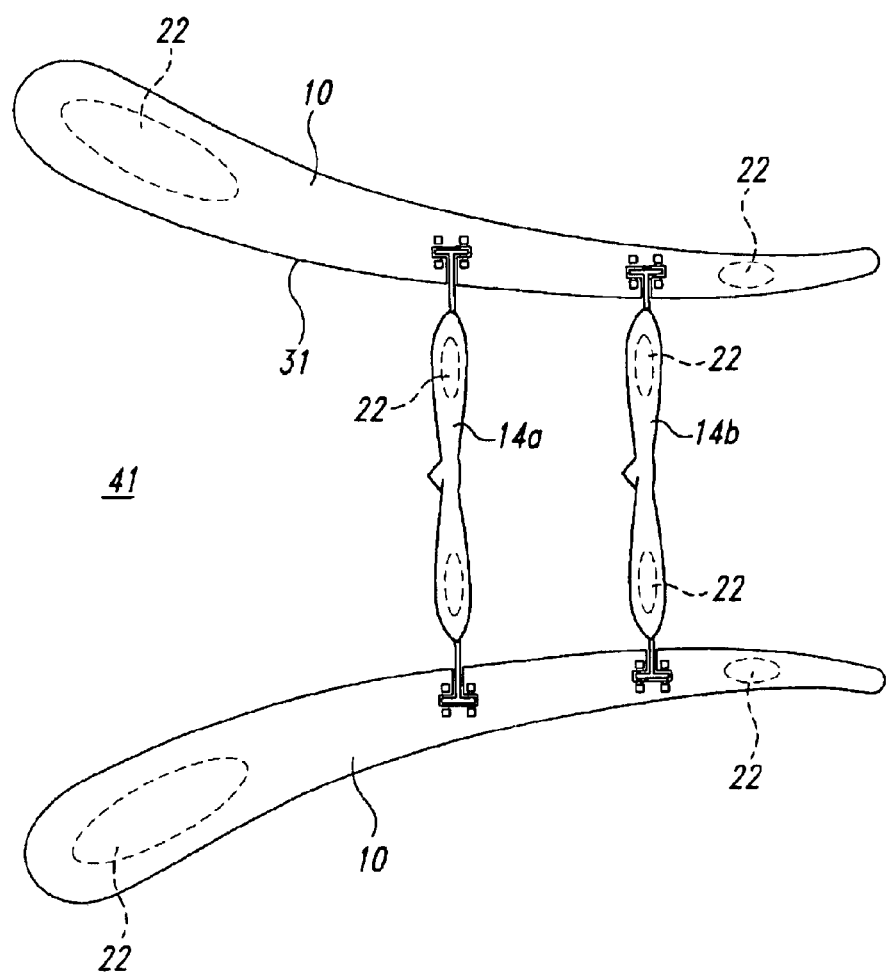
FIG. 6 is a cross-sectional view of a further alternative embodiment of the device of FIG. 1.

FIG. 6 illustrates a further alternative embodiment having a housing 10 with an interior shape 31 which provides a great concentration of the fluid flow. In the embodiment of FIG. 6, the inlet 41 of the housing is incredibly broad, and perhaps may be even more exaggerated than shown in this figure. The housing next down along the surface 31 to provide a great concentration of the large flow into a more narrow area. One or more propellers 14a and 14b are positioned within the narrowest portion of the housing 10. The large volume of water, which may be moving relatively slow at the inlet 41 is significantly increased in speed as it is pressed into a smaller diameter portion so as to cause rotation of the propellers 14a and 14b with a greater force.

The propellers 14a and 14b have no central support shaft in this particular embodiment, similar to the embodiments of FIGS. 1–4. In this embodiment, cavities 22 located within each of the blades provides for the buoyancy and support of the individual blades within the housing 10. The amount of fluid within each of the chambers 22 inside the blades can be selectively chosen to impart a desired buoyancy to the propellers in relation to the overall housing 10. Namely, the amount of fluid within the chambers 22 in the housing 10 will be matched to the amount of fluid inside the chambers 22 within the blades 14. The blades 14 will therefore have the same buoyancy as the surrounding housing so that the propellers are supporting their own weight relative to the housing. This means that they will not be need for bearings or other support structures inside the housing 10. Rather, the propellers 14 will bear their own weight based on the buoyancy within the cavities 22. They can therefore freely rotate within the slots in the housing 10. They will be treated as generally floating with respect to the housing 10. Position sensors, as well as buoyancy sensors can be placed adjacent the rotor and the stator within the housing 10 and, if desired, within the propeller 14. If the distance between the propeller 14 and the rotor is not appropriate, small amounts of fluid can be added to or removed from the respective propeller 14. Its position can therefore be exactly and accurately determined relative to the housing 10 by using mechanism having more or less water within each of the respective chambers 22. Of course, it may be desired to have the propellers at a very slightly buoyancy than the housing 10 to provide increased stability and add variance at the appropriate locations. The embodiment of having chambers 22 within the propellers can be used in each of the embodiments of FIGS. 1–7 as has been illustrated and explained in detail with respect to FIG. 6 as an example only.

Figure 8A:
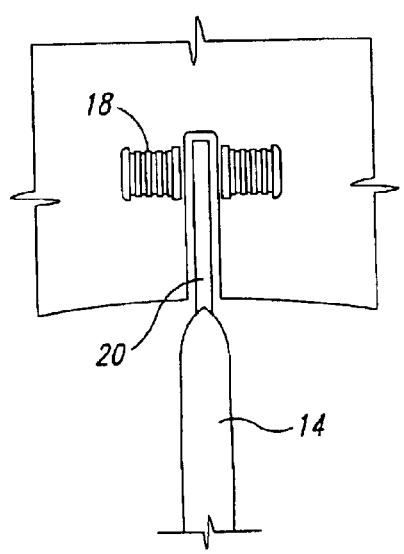
FIG. 8A is an enlarged view of one embodiment of the rotor and stator of the device of FIG. 2B taken along lines I—I.
Figure 9A:
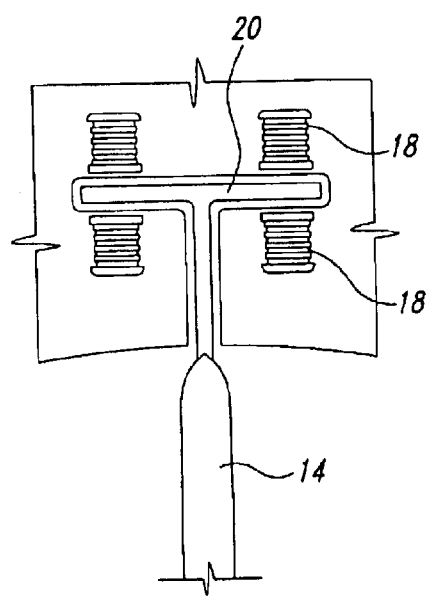
FIG. 9A is an enlarged view of a further alternative embodiment of the rotor and stator of the device of FIG. 2B taken along lines I—I

FIG. 8A illustrates one type of a rotor 20 stator 18 design. The propeller 14 has a rotor 20 at the tip thereof. The rotor 20 is made of a suitable material as could expected for a rotor of a generator. For example, it may be made of a nickel-iron core in the form of a permanent magnet, electromagnet, or any other suitable material for the rotor 20. The stator 18 has a windings thereon for generating electricity based on movement of the rotor 20. FIG. 9 illustrates an alternative embodiment of the rotor 20 and stator 18 interacting in order to generate electricity. FIGS. 8A and 9A are merely one embodiment of an acceptable rotor-stator combination and other embodiments may also be used as will be appreciated by those of skill in the art.

Figure 8B:
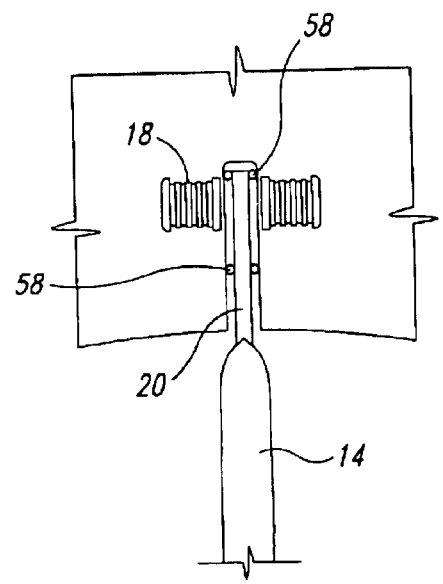
FIG. 8B is an enlarged view of an alternative embodiment of the rotor and stator of the device of FIG. 2B.
Figure 9B:
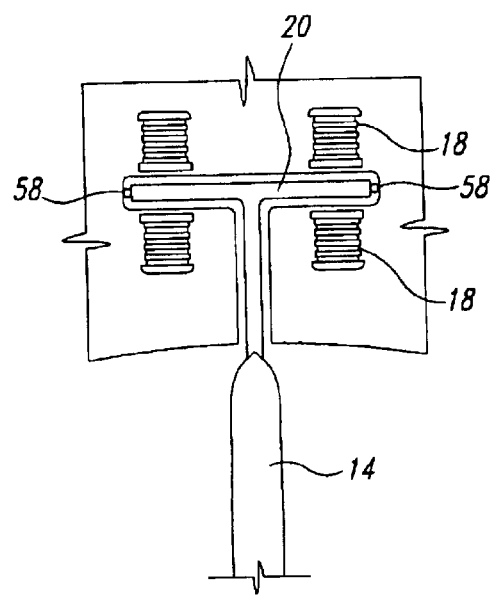
FIG. 9B is an enlarged view of a further alternative embodiment of the rotor and stator of the device of FIG. 2B taken along lines I—I.

FIGS. 8A and 9A illustrate the embodiments in which a mechanical bearing surface is not provided between the rotor and the stator. Namely, the ambient water pressure, together with flotation of the device acts as the bearing between the surfaces. FIGS. 8B and 9B illustrate an alternative embodiment which bearings 58 are provided between the rotor and the stator. As can be seen by viewing FIG. 8B, the bearings 58 are provided along the side wall of the rotor. Any pressure on the blade 14 will push it laterally so that having the bearings 58 positioned between the wall of the stator and the rotor will minimize the friction between the two surfaces and permit the rotor to spin easily with respect to the stator. FIG. 9B illustrates an alternative location for the bearings for a different shape of the rotor and stator. Of course, numerous other bearing locations can be provided if needed. For example, the bearings 58 may be positioned at other locations between the rotor and the stator as appropriate. Further, for different rotor and stator shapes and configurations, the bearings may be placed at the appropriate locations to provide a near friction-free movement between the two.

Figure 7:
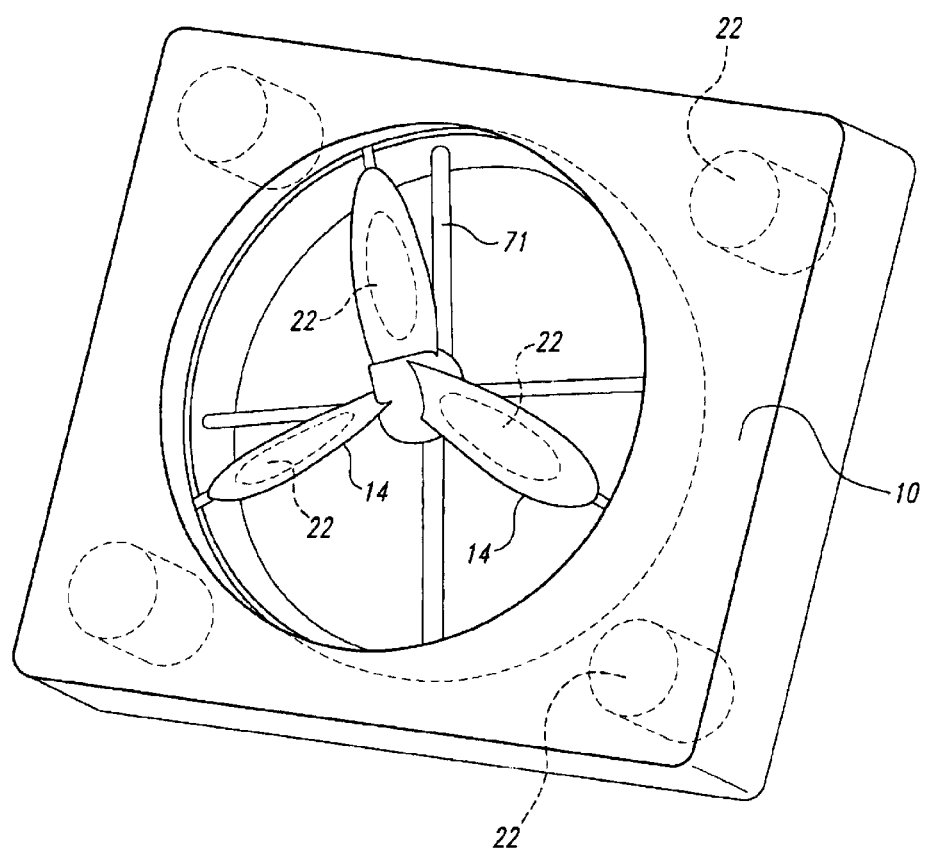
FIG. 7 is a further alternative embodiment of the device of FIG. 1.

FIG. 7 illustrates one potential embodiment which includes a combination of each of the elements explained herein. The housing 10 includes a plurality of chambers 22 at different locations. The different chambers 22 are separated from each other and can be selectively evacuated or flooded with water in order to achieve a desired orientation and buoyancy of the overall device. Further, the propeller 14 includes chambers 22 in each of the blades and each of the chambers 22 may be appropriately evacuated or filled with water in order to achieve a desired buoyancy of the propeller itself. Further, in the embodiment shown in FIG. 7, a central support spider 71 is positioned behind in assisting in support of the propeller 14. It will be appreciated that in most embodiments, the central support spider 71 is not present and the propeller 14 will be sufficiently supported by bearings in the outer surface near the rotor and/or by the buoyancy of the chamber itself. However, in some embodiments it may be desired to have the central spider 71 present during manufacture or even during operation. For example, the central support spider 71 may be present during manufacture outside of the water and the propellers 14 will have extensive weight and will need to be supported so as to not crush the interior surface of the rotor or the housing 10. After the housing 10 is placed in the water and sent to the appropriate depth by selective flooding of the chambers 22, then the propeller 14 will have a buoyancy based on the chambers which are filled with water. At this point, it may be desired to remove the effects of internal spider support 71. This may be done by completely removing the spider 71 or, removing the bearing surface therein but leaving in place for use in the support in the event the device needs to be later removed from the water for maintenance.

From the foregoing it will be appreciated that, although specific embodiments of the invention have been described herein for purposes of illustration, various modifications may be made without deviating from the spirit and scope of the invention. Accordingly, the invention is not limited except as by the appended claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A transportable marine current power installation comprising:
   a housing;
   a generator within the housing, the generator including a generator rotor and a generator stator, wherein the generator is driven by means of a rotor which is connected to the generator rotor and has a rotational axis, wherein the rotor of the power installation has at least one rotor blade which carries the generator rotor and has at least one cavity which can be flooded selectively with water, and wherein the power installation is arranged in an extensive marine current with the rotational axis of the rotor being substantially parallel to the marine current, provided the marine current is not a tidal current system.

2. A transportable marine current power installation with buoyancy control comprising a housing which accommodates a generator comprising a generator rotor and a generator stator, wherein the generator is driven by means of a rotor which is connected to the generator rotor and has a rotational axis, wherein the rotor of the power installation has at least one rotor blade which carries the generator rotor and has at least one cavity which can be selectively flooded with water or evacuated of water to control the buoyancy of the power installation, and wherein the power installation is arranged in an extensive marine current with the rotational axis of the rotor being substantially parallel to the marine current, provided the marine current is not a tidal current system.

3. A marine current power installation according to claim 2, wherein at least one cavity of the rotor blades are configured to be capable of regulating the amount of water in the cavity by flooding the cavity with water or removing all or part of the water.

4. A marine current power installation according to claim 3, wherein the housing of the power installation has closed cavities which capable of regulating the amount of water in the cavity by flooding the cavity with water or removing all or part of the water.

5. A marine current power installation according to claim 2, wherein the housing of the power installation is formed at least in part as a concentrator, by means of which the flow speed of the water passing into the power installation is increased.

6. A marine current power installation according to claim 5, wherein the housing of the power installation has closed cavities which capable of regulating the amount of water in the cavity by flooding the cavity with water or removing all or part of the water.

7. A marine current power installation according to claim 3, wherein the housing of the power installation is formed at least in part as a concentrator, by means of which the flow speed of the water passing into the power installation is increased.

8. A marine current power installation according to claim 7, wherein the housing of the power installation has closed cavities which capable of regulating the amount of water in the cavity by flooding the cavity with water or removing all or part of the water.

9. A marine current power installation according to claim 2, wherein the housing of the power installation has closed cavities which are capable of capable of regulating the amount of water in the cavity by flooding the cavity with water or removing all or part of the water.

10. A transportable marine current power installation with buoyancy control, comprising:
    a housing;
    a generator having a generator rotor and a generator stator, the generator being coupled to the housing;
    a rotor having a plurality of rotor blades and a rotational axis; and
    a chamber within each of the rotor blades, wherein each chamber is capable of being selectively evacuated or filled with liquid to selectively control the buoyancy of the marine current power installation in a marine current, said marine current being substantially parallel to the rotational axis of the rotor.

11. A transportable marine current power installation with buoyancy control according to claim 10, wherein the marine current power installation can be positioned in different operative depths in the marine current by adjusting the amount of water in the chambers of the rotor blades.

12. A transportable marine current power installation with buoyancy control according to claim 10, further comprising at least one chamber in the housing, said chamber is capable of being selectively evacuated or filled with liquid to selectively control the buoyancy of the marine current power installation in the marine current.

13. A transportable marine current power installation with buoyancy control according to claim 12, wherein the marine current power installation can be positioned in different operative depths in the marine current by adjusting the amount of water in the chamber of the housing.

* * * * *